United States Patent
Hrovat et al.

(10) Patent No.: US 9,669,677 B2
(45) Date of Patent: Jun. 6, 2017

(54) VEHICLE ACTIVE SUSPENSION SYSTEM AND METHOD OF CONTROL

(71) Applicant: FORD GLOBAL TECHNOLOGIES, LLC, Dearborn, MI (US)

(72) Inventors: Davorin David Hrovat, Ann Arbor, MI (US); Li Xu, Northville, MI (US); Eric Hongtei Tseng, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/723,584

(22) Filed: May 28, 2015

(65) Prior Publication Data

US 2016/0347143 A1 Dec. 1, 2016

(51) Int. Cl.
 *B60G 17/0165* (2006.01)

(52) U.S. Cl.
 CPC .... *B60G 17/0165* (2013.01); *B60G 2400/823* (2013.01); *B60G 2600/182* (2013.01); *B60W 2520/10* (2013.01); *B60W 2550/10* (2013.01); *B60W 2710/20* (2013.01); *B60W 2710/22* (2013.01)

(58) Field of Classification Search
 CPC .......... B60G 17/0165; B60W 2710/20; B60W 2710/22; B60W 2520/10; B60W 2550/10
 See application file for complete search history.

(56) References Cited

U.S. PATENT DOCUMENTS

| 2,790,327 | A | * | 4/1957 | Herndon | ................. F16D 67/00 477/130 |
| 3,073,405 | A | * | 1/1963 | Hill | ........................ B60T 8/322 180/244 |
| 3,213,710 | A | * | 10/1965 | Hayward | ................ F16H 47/08 74/665 F |
| 3,276,411 | A | * | 10/1966 | Stedman | ................... F41G 7/00 114/21.1 |
| 7,675,432 | B2 | | 3/2010 | Leicht | |
| 8,065,054 | B2 | | 11/2011 | Tarasinski et al. | |
| 8,788,146 | B1 | * | 7/2014 | Lu | ........................ B60G 17/015 280/5.518 |
| 8,948,501 | B1 | * | 2/2015 | Kim | ..................... G01S 7/4808 345/419 |
| 2004/0049323 | A1 | | 3/2004 | Tijerina et al. | |

(Continued)

FOREIGN PATENT DOCUMENTS

| DE | 102005009701 B4 | 4/2008 |
| DE | 102006052368 A1 | 5/2008 |
| DE | 102013100982 A1 | 8/2014 |

*Primary Examiner* — Rodney Butler
*Assistant Examiner* — Frederick Brushaber
(74) *Attorney, Agent, or Firm* — Frank A. MacKenzie; Brooks Kushman P.C.

(57) ABSTRACT

A vehicle active suspension system, a vehicle, and a method of controlling a vehicle active suspension system are provided. The vehicle active suspension system may include a suspension actuator and a controller. The controller may be programmed to, in response to an object being detected within a predetermined range of a vehicle while a vehicle speed is greater than a threshold speed, categorize the object into at least one of a plurality of predefined categories. The controller may be further programmed to actuate the suspension actuator according to a predefined actuation profile.

12 Claims, 3 Drawing Sheets

(56) References Cited

U.S. PATENT DOCUMENTS

| | | | |
|---|---|---|---|
| 2009/0097038 A1* | 4/2009 | Higgins-Luthman | B60G 17/019 356/602 |
| 2009/0273458 A1* | 11/2009 | Almqvist .................. | A61B 5/18 340/439 |
| 2013/0060423 A1 | 3/2013 | Jolly | |
| 2013/0127610 A1* | 5/2013 | Sanma ................... | B62D 1/046 340/438 |
| 2013/0218415 A1* | 8/2013 | Stahlin ................. | B60W 10/18 701/41 |
| 2013/0342365 A1 | 12/2013 | Kiefer et al. | |
| 2015/0165997 A1* | 6/2015 | Nilsson ............... | B60R 21/0134 701/45 |
| 2016/0009317 A1* | 1/2016 | Evreinov ............... | B62D 1/046 701/36 |
| 2016/0129920 A1* | 5/2016 | Hall ...................... | B60W 50/16 701/1 |

* cited by examiner

VEHICLE ACTIVE SUSPENSION SYSTEM AND METHOD OF CONTROL

TECHNICAL FIELD

The present disclosure relates to a vehicle active suspension system and a method of controlling the active suspension system.

BACKGROUND

Vehicles may be provided with an advanced operator warning system. The advanced operator warning system may provide an operator of the vehicle with a notification or warning should the advanced operator warning system detect a potential safety hazard. These potential safety hazards may include the presence of other vehicles proximate the vehicle, lane drifting, and collision avoidance. The advanced operator warning system may provide audible, visual, or haptic feedback to provide the operator of the vehicle with a warning prior to encountering the potential safety hazard to provide the operator with sufficient time to react, avoid, or mitigate an encounter with the potential safety hazard.

SUMMARY

A vehicle active suspension system is provided. The vehicle active suspension system may include a suspension actuator and a controller. The suspension actuator may be operatively connected to a body and a wheel assembly. The controller may be programmed to, in response to an object being detected by an object detection sensor while a vehicle speed is greater than the threshold speed, categorize the object into one of a plurality of predefined categories. The controller may be further programmed to actuate the suspension actuator according to a predefined actuation profile associated with one of the predefined categories.

A vehicle may include a suspension actuator and a controller. The controller may be programmed to in response to an object being detected forward of the vehicle and an identification of a type of the object, the controller may actuate the suspension actuator to induce a vibration signature in the vehicle. The vibration signature may be induced in the vehicle according to the type of the object such that a different identified type of the object results in a different vibration signature.

A method of controlling a vehicle active suspension system is provided. The method may include detecting an object within a predetermined distance of a vehicle and categorizing the object into one of a plurality of predefined categories. The active suspension system may be actuated to induce a vibration signature in the vehicle according to a predetermined actuation profile specific to the one of the predefined categories and a vehicle speed prior to encountering the object.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
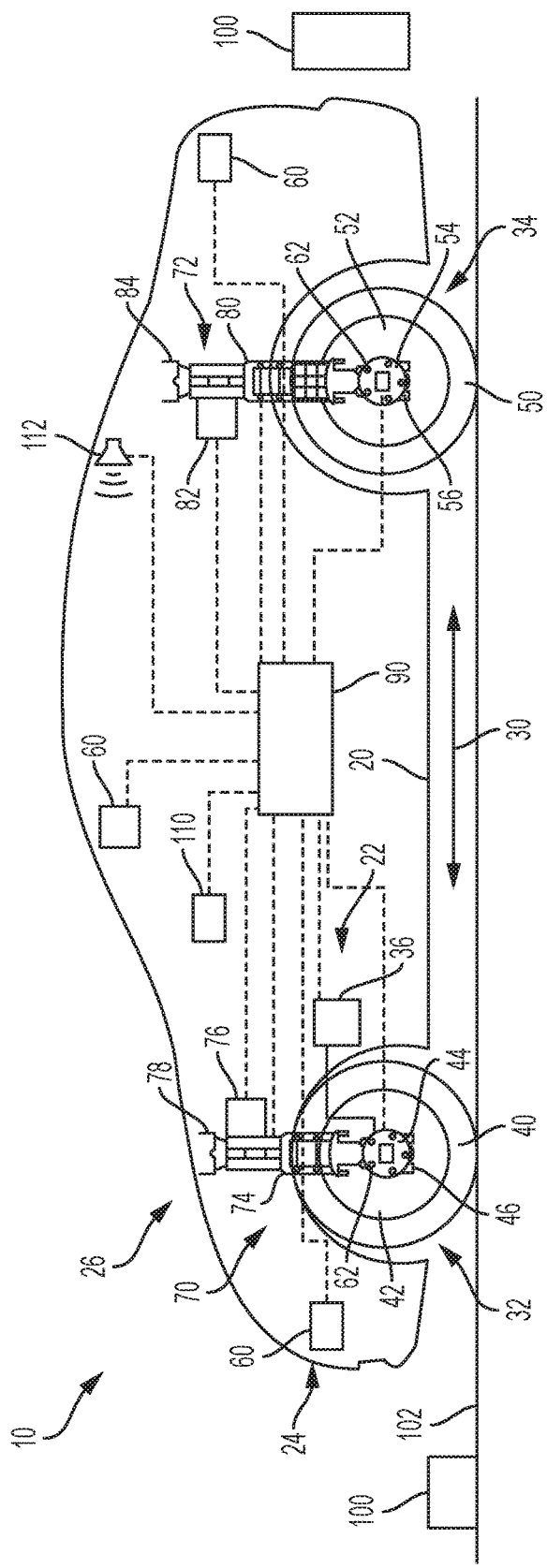
FIG. 1 is a schematic representation of a vehicle having an active suspension system.

Referring to FIG. 1, a schematic diagram of a vehicle 10 is illustrated according to an embodiment of the present disclosure. Physical placement and orientation of the components within the vehicle 10 may vary. The vehicle 10 may be a motor vehicle such as an automobile, a truck, farm equipment, or military transport vehicle. The vehicle 10 may include a vehicle body 20, a steering system 22, a sensor system 24, and a suspension system 26.

The steering system 22 may be operatively connected to a vehicle wheel assembly 30. The vehicle wheel assembly 30 may include a first wheel assembly 32 and a second wheel assembly 34 longitudinally spaced apart from the first wheel assembly 32. Commonly the first wheel assembly 32 may be referred to as a front axle and the second wheel assembly 34 may be referred to as a rear axle.

The steering system 22 may be configured to articulate or pivot the first wheel assembly 32 about a kingpin axis to vary a pivotal position of the wheels of the first wheel assembly 32. The steering system 22 may include a steering wheel in rotatable connection with the first wheel assembly 32 through a steering mechanism 36. The steering mechanism 36 may be configured to pivot or articulate the first wheel assembly 32 about the kingpin axis responsive to the rotation of the steering wheel via steering linkages or steering arms operatively connected to the first wheel assembly 32.

The steering system 22 may be provided with a steering ratio that may correlate an amount of rotation of the steering wheel to the amount of pivoting or rotation of the first wheel assembly 32. A higher steering ratio may equate to a larger amount of rotation of the steering wheel to turn the first wheel assembly 32. A lower steering ratio may equate to a lesser amount of rotation of the steering wheel to turn the first wheel assembly 32. The steering mechanism 36 may be a rack and pinion steering mechanism, a recirculating ball steering mechanism, a worm and sector steering mechanism, variable ratio steering mechanism, electric power assisted steering, or other configuration that may pivot or articulate vehicle wheels.

The first wheel assembly 32 may include a first tire 40, a first wheel 42, a first wheel hub 44, and a first steering knuckle 46. The first tire 40 may be mounted on the first wheel 42. The first wheel 42 may be rotatably mounted on the first wheel hub 44. The first wheel hub 44 may be mounted to the first steering knuckle 46. The first steering knuckle 46 may ultimately connect the first wheel assembly 32 to a vehicle chassis that may be operatively connected to the vehicle body 20. A separate wheel assembly may be laterally spaced apart from the first wheel assembly 32.

The second wheel assembly 34 may include a second tire 50, a second wheel 52, a second wheel hub 54, and a rear knuckle 56. The second tire 50 may be mounted on the second wheel 52. The second wheel 52 may be rotatably mounted on the second wheel hub 54. The second wheel hub 54 may be mounted to the rear knuckle 56. The rear knuckle 56 may ultimately connect the second wheel assembly 34 to a vehicle chassis that may be operatively connected to the vehicle body 20. A separate wheel assembly may be laterally spaced apart from the second wheel assembly 34.

The sensor system 24 may include a plurality of vehicle sensors. The plurality of vehicle sensors may include an object detection sensor 60 and a wheel speed sensor 62. The object detection sensor 60 may be disposed proximate a windshield, a front portion, a front bumper, a rear window, a rear portion, or a rear bumper of the vehicle 10. The object detection sensor 60 may be a camera or vision system, a parking sensor, a proximity sensor, a side looking sensor, a forward/rearward looking sensor, or a combination thereof. The camera may be a forward-looking camera or a rearward looking camera configured to provide visual information as to obstacles or objects forward or rearward of the vehicle 10. The parking sensor, the proximity sensor, the side looking sensor, or the forward/rearward looking sensor may be at least one of an ultrasonic sensor, a radar, a light detection and ranging (LIDAR) device, radio detection and ranging (RADAR) device, laser scanner, or a combination thereof. The number, type, and/or the positioning of the object detection sensor 60 may vary based on the vehicle application. The object detection sensor 60 may be configured to provide data or a signal indicative of objects within a predetermined range of the object detection sensor 60 or the vehicle 10.

The wheel speed sensor 62 may be disposed proximate at least one of the first wheel hub 44 of the first wheel assembly 32 and the second wheel hub 54 of the second wheel assembly 34. The wheel speed sensor 62 may be configured to provide data or a signal indicative of a rotational speed or angular velocity of the tire, wheel, and/or wheel hub. The wheel speed sensor 62 may ultimately provide data or a signal indicative of a vehicle speed.

The suspension system 26 may be configured to interconnect the vehicle wheel assembly 30 to the vehicle body 20. The suspension system 26 may also be configured to interconnect the vehicle wheel assembly 30 to the vehicle chassis that is connected to the vehicle body 20. The suspension system 26 may be an active suspension system or a semi-active suspension system.

The suspension system 26 may include a first wheel suspension assembly 70 and a second wheel suspension assembly 72. The first wheel suspension assembly 70 may be operatively coupled to the first wheel assembly 32 via control arms or linkages and may be operatively coupled to the vehicle body via a first mount 78. The first wheel suspension assembly 70 may include a first suspension actuator 74 and a first power supply/amplifier 76. The first suspension actuator 74 may be operatively connected to the vehicle body 20 and the first wheel assembly 32. The first suspension actuator 74 may be an electro-hydraulic or electro-mechanical actuator. The first suspension actuator 74 may be configured to replace a strut or shock absorber or other passive dampers. In at least one embodiment, the first suspension actuator 74 may include a spring element such as a coil spring or a portion spring, disposed about or proximate the first suspension actuator 74.

The first suspension actuator 74 may be configured to actively control vehicle kinematics. The first suspension actuator 74 may control or vary the first wheel suspension assembly ride height, suspension displacement or wheel assembly travel in jounce or rebound, suspension loading, suspension rates and damping coefficients, and relative distances between the first wheel assembly 32 and the vehicle body 20. The first suspension actuator 74 may be configured to induce a vibration signature in the vehicle 10. The vibration signature may have a variable frequency and amplitude. The vibration signature may result in relative motion between the vehicle body 20 and the first wheel suspension assembly 70 of the suspension system 26.

Power may be provided to the first suspension actuator 74 through the first power supply/amplifier 76. The power provided may energize a component of the first suspension actuator 74 that may result in a desired wheel body force or deflection. In at least one embodiment, the first power supply/amplifier 76 may be replaced with a hydraulic motor operatively connected to a hydraulic fluid source that may energize the first suspension actuator 74.

The second wheel suspension assembly 72 may be operatively coupled to the second wheel assembly 34 via control arms or linkages and may be operatively coupled to the vehicle body 20 via a second amount 84. The second wheel suspension assembly 72 may include a second suspension actuator 80 and a second power supply/amplifier 82. The second suspension actuator 80 may be operatively connected to the vehicle body 20 and the second wheel assembly 34. The second suspension actuator 80 may be an electro-hydraulic or electro-mechanical actuator. The second suspension actuator 80 may be configured to replace a strut or shock absorber or other passive dampers. In at least one embodiment, the second suspension actuator 80 may include a spring element such as a coil spring or a portion spring, disposed about or proximate the second suspension actuator 80.

The second suspension actuator 80 may be configured to actively control vehicle kinematics. The second suspension actuator 80 may control or vary the second wheel suspension assembly 72 ride heights, suspension displacement or wheel assembly travel in jounce or rebound, suspension loading, suspension rates and damping coefficients, and relative distances between the second wheel assembly 34 and the vehicle body 20. The second suspension actuator 80 may be configured to induce a vibration signature in the vehicle 10. The vibration signature may have a variable frequency and amplitude. The vibration signature may result in relative motion between the vehicle body 20 and the second wheel suspension assembly 72 of the suspension system 26.

Power may be provided to the second suspension actuator 80 through the second power supply/amplifier 82. The power may energize a component of the second suspension actuator 80 that may result in a desired wheel body force or deflection. In at least one embodiment, the second power supply/amplifier 82 may be replaced with a hydraulic motor operatively connected to a hydraulic fluid source that may energize the second suspension actuator 80.

A controller 90 may be in communication between various vehicle subsystems, systems, and components. More specifically, the controller 90 may be in communication with the steering system 22, the sensor system 24, and the suspension system 26. In at least one embodiment, the controller 90 may be a member of a larger control system that may include several controllers. The individual controllers or the control system may be influenced by various other controllers throughout the vehicle 10 in which a vehicle system controller (VSC) operates at a higher hierarchy relative to other controllers.

The controller 90 may include at least one microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The VSC and other controllers communicate with the plurality of sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU.

Although not explicitly illustrated, those of ordinary skill in the art will recognize various functions or components that may be controlled by the VSC within each of the subsystems identified above. Representative examples of parameters, systems, and/or components that may be directly or indirectly actuated using control logic executed by the controller include steering ratio, suspension deflection, suspension vibration or oscillation, autonomous vehicle maneuvers, front-end accessory drive (FEAD) components such as an alternator, air conditioning compressor, battery charging, braking, transmission gear ratio, and acceleration/deceleration.

The controller 90 may be in communication with the sensor system 24. More specifically, the controller 90 may be in communication with the object detection sensor 60. The controller 90 may be programmed to in response to an object 100 detected by the object detection sensor 60 within a predetermined distance or range of the vehicle 10, to identify the object 100. For example, the controller 90 may be configured to categorize the object 100 detected by the object detection sensor 60 into at least one of a plurality of predefined categories or types. The predefined categories or types may include road obstructions or imperfections such as potholes or other cavities within the road surface 102. The predefined categories or types may further include debris, obstacles, or other objects disposed on the road surface 102. The predefined categories or types may still further include other vehicles forward, rearward, or proximate the vehicle 10.

The controller 90 may be programmed to actuate at least one of the first suspension actuator 74 and the second suspension actuator 80 in response to an object 100 detected within a predetermined range of the vehicle 10. At least one of the first suspension actuator 74 and the second suspension actuator 80 may be actuated according to a plurality of predefined actuation profile associated with the predefined category or type of the object 100. The predefined actuation profile associated with the predefined category or type of the object 100 may provide a varying frequency and/or amplitude of the vibration signature imparted to the vehicle 10 by the first suspension actuator 74 and/or the second suspension actuator 80. The first suspension actuator 74 and the second suspension actuator 80 may be actuated simultaneously, sequentially, or intermittently such that one side of the vehicle 10 is actuated or opposing corners of the vehicle 10 are actuated.

Each different identified category/type of object 100 may result in different vibration signatures imparted to the vehicle 10. The frequency and amplitude of the vibration signature may be varied based on the vehicle speed provided by the wheel speed sensor 62 and/or the category/type of the object 100. The frequency of the vibration signature induced by the suspension actuators may be varied within a range of 1 Hz to 100 Hz. In at least one embodiment, the vibration signature induced by the suspension actuators may simulate the vibration induced into the vehicle 10 by the vehicle wheel assembly 30 encountering rumble strips or raised pavement markers. The vibration signature may be induced by the suspension actuators prior to the vehicle 10 encountering the object 100.

A user interface 110 may be in communication with the controller 90. The controller 90 may be programmed to generate output for display via the user interface 110. The user interface 110 may be configured to display an indicator indicative of the category/type of the object 100 detected by the object detection sensor 60. The indicator indicative of the category/type of the object 100 detected by the object detection sensor 60 may be a visual indicator, an auditory signal/indicator, or a haptic indicator.

Figure 2:
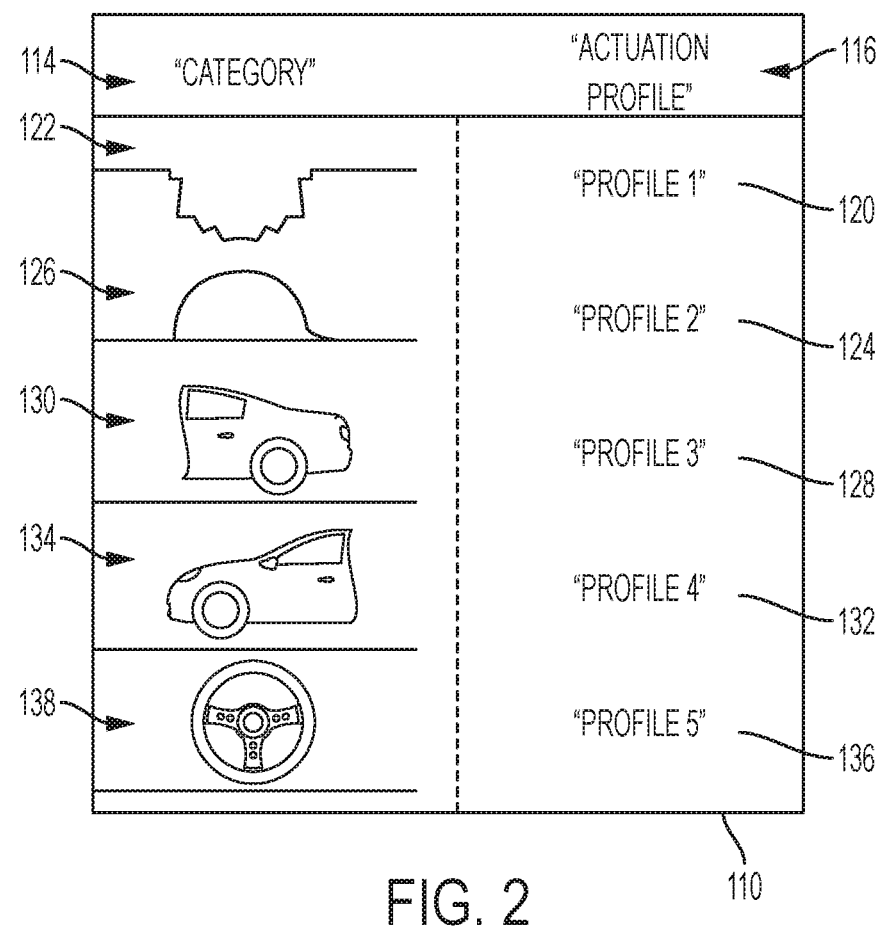
FIG. 2 is an exemplary user interface display.

Referring to FIG. 2, an exemplary user interface 110 is shown. The user interface 110 may include a speaker 112 configured to provide the auditory signal/indicator. For example, the auditory signal may simulate the noise produced by a vehicle wheel encountering a rumble strip and the amplitude and frequency of the auditory signal may vary based on the vehicle speed. May display the category/type 114 of the object 100 detected by the object detection sensor 60. The user interface 110 may display the actuation profile 116 associated with the category/type 114 of the object 100 detected by the object detection sensor 60.

A first actuation profile 120 may be associated with a first category/type 122 such as potholes or other cavities within the road surface 102. A second actuation profile 124 may be associated with a second category/type 126 such as debris, obstacles, speed bumps, or other objects disposed on or extending from the road surface 102. A third actuation profile 128 may be associated with a third category/type 130 such as a vehicle rearward of the vehicle 10. A fourth actuation profile 132 may be associated with a fourth category/type 134 such as a vehicle forward of the vehicle 10. A fifth actuation profile 136 may be associated with an autonomous vehicle handover 138 to an operator of the vehicle 10. Other actuation profiles may also be provided based on other scenarios or objects detected proximate the vehicle 10. For example, an operator drowsiness detection system may be in communication with the controller 90. The suspension actuators may be actuated according to an actuation profile associated with operator drowsiness to alert an operator of the vehicle 10 if operator drowsiness is detected.

The controller 90 may be configured to actuate the first suspension actuator 74 in response to the vehicle 10 approaching an object 100 while a vehicle speed is greater than a threshold vehicle speed. The vibration signature induced by the actuation of the first suspension actuator 74 may provide the operator of the vehicle 10 a notification to reduce vehicle speed. The vibration signature may be induced at least until the vehicle speed becomes less than the threshold vehicle speed. For example, while the vehicle 10 is traveling toward an object 100 detected to be forward of the vehicle 10, the first suspension actuator 74 may be actuated to induce a vibration signature in the vehicle 10 according to the type and/or category of the object 100. In a further example, while the vehicle 10 is traveling toward an object 100 detected to be rearward of the vehicle 10 the second suspension actuator 80 may be actuated to induce a vibration signature in the vehicle 10 according to the type and/or category of the object 100.

The controller 90 may be configured to actuate the second suspension actuator 80 in response to the vehicle 10 approaching an object 100 while the vehicle is executing a parking maneuver. The vibration signature induced by the actuation of the second suspension actuator 80 may simulate impact with the object 100 detected to be rearward of the vehicle 10. For example while the vehicle 10 is traveling toward an object 100 detected to be rearward of the vehicle 10, the second suspension actuator 80 may be actuated to induce a vibration signature in the vehicle 10 according to the type and/or category of the object 100.

The controller 90 may be configured to actuate at least one of the first suspension actuator 74 and the second suspension actuator 80 in response to the vehicle 10 nearing completion of an autonomous vehicle maneuver. The autonomous vehicle maneuver may be autonomous operation of the vehicle 10, a parking maneuver, or other operation of the vehicle that does not require operator intervention. In at least one embodiment, the controller 90 may be configured to actuate at least one of the first suspension actuator 74 and the second suspension actuator 80 in response to the vehicle 10 encountering a road hazard that may require operator intervention. The vibration signature induced by the actuation of at least one of the first suspension actuator 74 and the second suspension actuator 80 may notify an operator of the vehicle 10 to prepare for vehicle takeover/handover.

Figure 3:
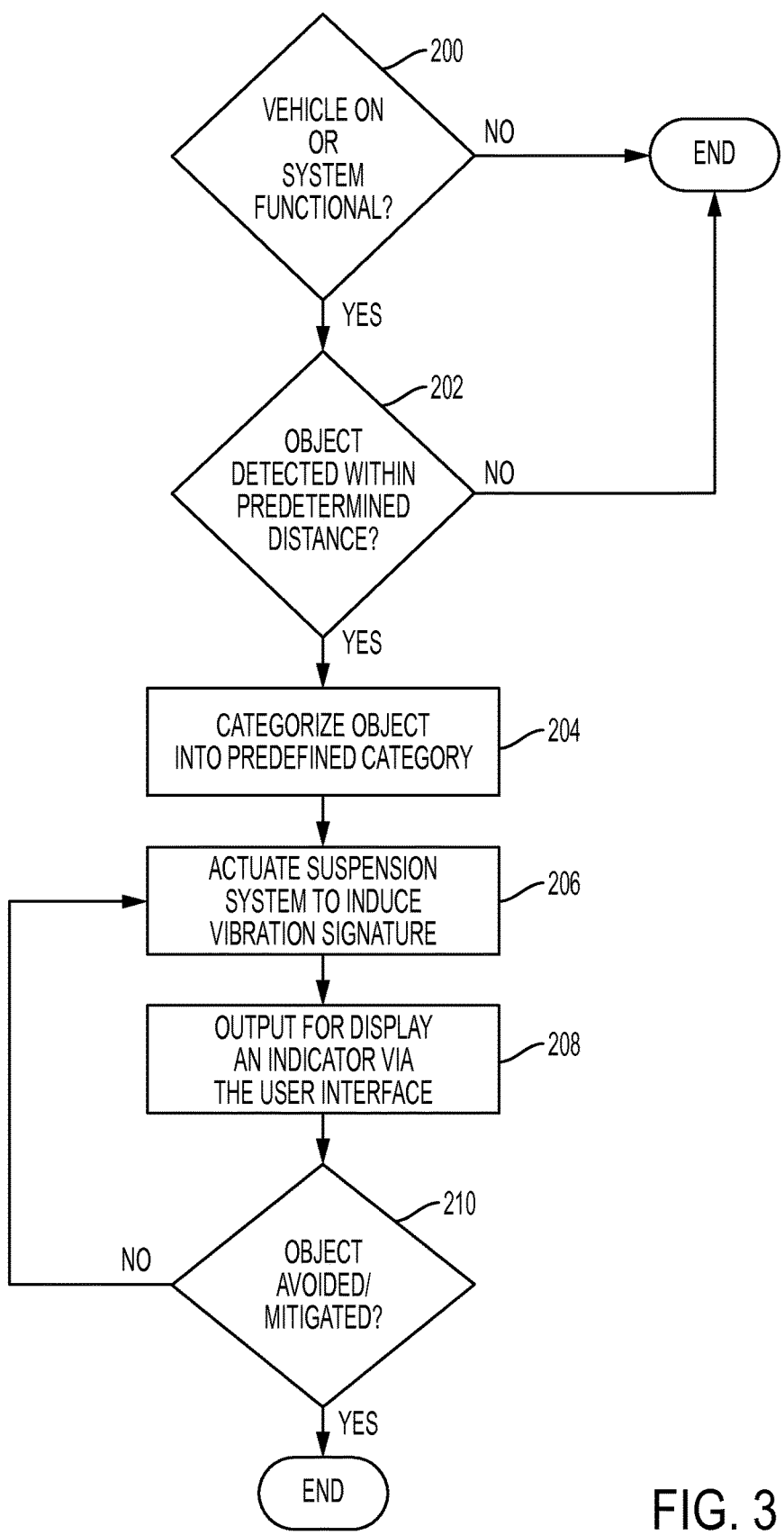
FIG. 3 is a flow chart describing a method of controlling a vehicle active suspension system.

Referring to FIG. 3, a flow chart illustrating an exemplary method of controlling a vehicle active suspension system is shown. As will be appreciated by one of ordinary skill in the art, the flowchart represents control logic that may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the controller 90 and may be implemented as a closed loop control system. For brevity, the method will be described in the context of a single iteration below.

At block 200, the method may assess the operating state of the vehicle, which may include assessing whether the suspension system and/or the control system is functional. For example, if the vehicle ignition is off, the engine is not running, or the suspension system and/or control system is not functional or functioning properly, then the method or current method iteration may end. If the vehicle is on and moving and the suspension system 26 and/or the controller 90 may be functioning properly, the method may continue to block 202. In at least one embodiment, the method may assess the vehicle speed and the direction of travel of the vehicle 10. The method may assess whether the vehicle 10 is traveling forward, rearward, turning, or performing an autonomous maneuver.

At block 202, the method may determine if an object 100 is detected to be within a predetermined distance or range from the vehicle 10. Should an object 100 not detected to be within the predetermined distance or range from the vehicle, the method may end. If the object 100 is detected to be within the predetermined distance or range from the vehicle 10 the method may categorize the object 100 or classify the object 100 into at least one of a plurality of predefined categories at block 204.

At block 206, the method may actuate the suspension system 26 to induce a vibration signature in the vehicle 10 prior to the vehicle 10 encountering the object 100. More specifically, at least one of the first suspension actuator 74 and the second suspension actuator 80 may be actuated according to a predetermined actuation profile associated with the at least one of the plurality of predefined categories and a vehicle speed to induce a vibration signature in the vehicle body 20. The predetermined actuation profile associated with the at least one of the plurality of predefined categories and the vehicle speed may vary a frequency and an amplitude of the vibration signature.

In at least one embodiment, the method may vary a steering ratio of the steering system 22. The steering ratio may be varied while the vibration signature is induced in the vehicle 10. The steering ratio may be varied such that an operator of the vehicle 10 may be inhibited from over correcting the vehicle 10 to avoid the object 100.

At block 208, the method may output for display, via the user interface 110, an indicator while the vibration signature is induced in the vehicle 10. The indicator may be an auditory signal output by a speaker 112, indicative of the category of the object 100 detected by the object detection sensor 60. The indicator may be a visual indicator displayed by the user interface 110, indicative of the category of the object 100 detected by the object detection sensor 60.

At block 210, the method may assess whether the object 100 detected by the object detection sensor 60 has been avoided or mitigated. The object 100 detected by the object detection sensor 60 may be avoided if the vehicle speed is reduced to below a threshold, the object 100 is no longer within the predetermined distance or range from the vehicle 10, or a vehicle path has been changed. Should the object 100 detected by the object detection sensor 60 not have been avoided or mitigated, the suspension system 26 may continue to be actuated and the indicator may continue to be displayed by the user interface 110. If the object 100 detected by the object detection sensor has been avoided or mitigated, the method may end.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a suspension actuator; and
   a controller programmed to, in response to an object being detected forward of the vehicle and a vehicle speed exceeding a threshold, identify an object classification associated with the object and actuate the suspension actuator to induce a vibration signature in the vehicle based on the object classification such that a different identified object classification results in a different vibration signature.

2. The vehicle of claim 1 further comprising a user interface configured to provide an auditory signal in response to the object being detected forward of the vehicle.

3. The vehicle of claim 2, wherein the user interface is further configured to display an indicator indicative of the object classification.

4. The vehicle of claim 1 further comprising a steering system, wherein the controller is further programmed to vary a steering ratio of the steering system responsive to the vibration signature being induced in the vehicle.

5. The vehicle of claim 1 wherein the controller is further programmed to, in response to the object being detected rearward of the vehicle and a parking maneuver being executed by the vehicle, identify the object classification associated with the object and actuate the suspension actuator to induce the vibration signature in the vehicle based on the object classification and the vehicle speed.

6. The vehicle of claim 1 wherein the controller is further programmed to, in response to the object being detected forward of the vehicle and an autonomous maneuver being executed by the vehicle, identify the object classification associated with the object and actuate the suspension actuator to induce the vibration signature in the vehicle based on the object classification prior to completion of the autonomous maneuver.

7. The vehicle of claim 1 wherein the vibration signature has a frequency within a range of 1 Hz to 100 Hz.

8. The vehicle of claim 1, wherein the object classification includes at least one of road obstructions, road debris, road speed bumps, and other vehicles.

9. The vehicle of claim 1, wherein the controller is further programmed to vary at least one of a frequency and an amplitude of the vibration signature based on at least one of a wheel speed and the object classification.

10. The vehicle of claim 1, further comprising a user interface and the controller being further programmed to display a notification to a driver of the vehicle to reduce the vehicle speed below the threshold.

11. The vehicle of claim 10, wherein the controller is further programmed to actuate the suspension actuator until the vehicle speed is less than the threshold.

12. The vehicle of claim 1, wherein the controller is further programmed to, in response to an autonomous vehicle maneuver being completed by the vehicle, actuate the suspension actuator to induce the vibration signature to notify a driver of the vehicle of a vehicle handover.

* * * * *